Oct. 16, 1951  N. A. TUCKER  2,571,313
WELDING OF METALLIC TIPS TO METALLIC BASES
Filed Feb. 27, 1950
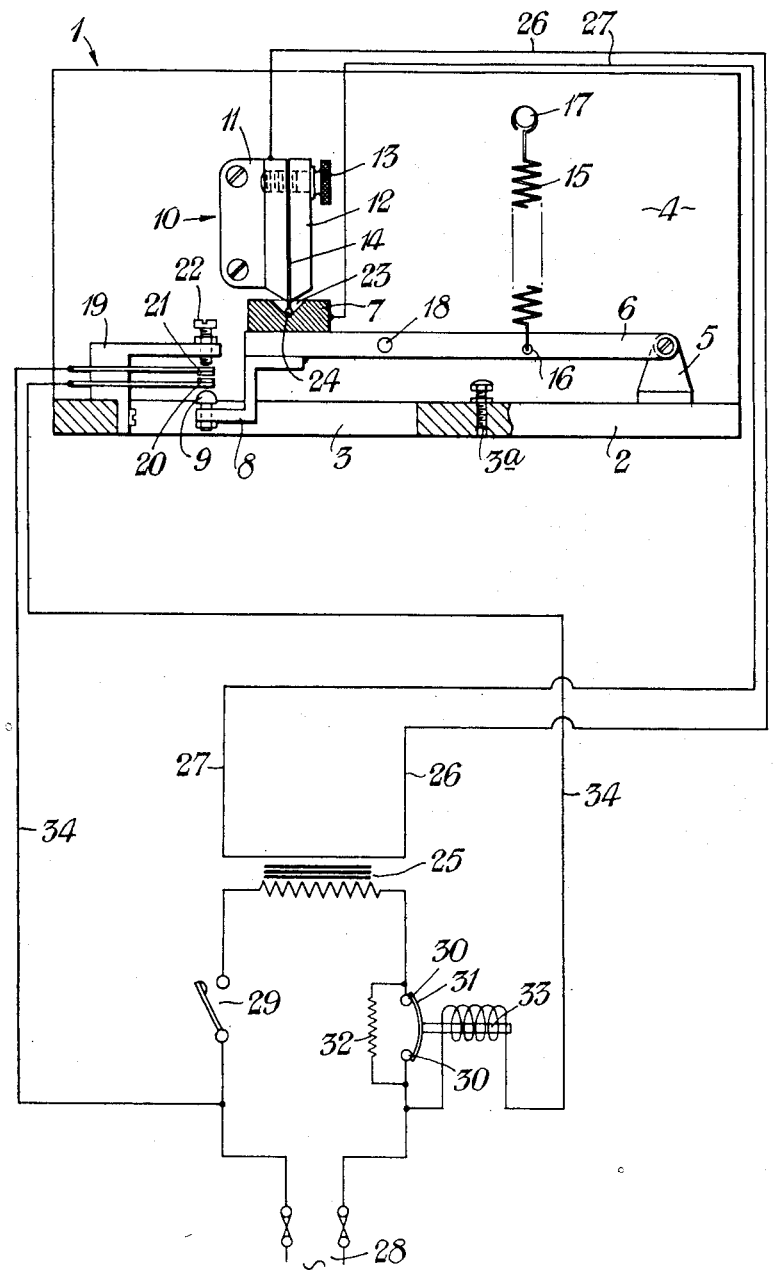
Inventor
NORMAN ALBERT TUCKER.
BY Howson and Howson
his Attorneys.

Patented Oct. 16, 1951

2,571,313

UNITED STATES PATENT OFFICE 2,571,313

WELDING OF METALLIC TIPS TO METALLIC BASES

Norman Albert Tucker, London, England, assignor to Johnson, Matthey & Company Limited, London, England, a British company Application February 27, 1950, Serial No. 146,576
In Great Britain March 1, 1949

7 Claims. (Cl. 219—4)

This invention relates to improvements in and relating to the art of resistance welding and is more particularly concerned with the welding of metallic tips to metallic bases, such as is required in the manufacture of pen nibs or electrical contacts.

Ordinary resistance welding operations usually consist in forcing together parts to be welded, and, by the passage of an electric current, causing the deformation of the metal, the time of passage of welding current being normally controlled by a time-operated relay.

In the application of this method to the welding of metallic tips to pen nibs, a nib and tip are brought into, or placed in, contact with one another and heat is applied, for example by means of an electric current passing through the nib and tip to cause the nib to melt and flow over the tip. The current is then cut-off and the molten metal freezes, whereby the tip becomes welded to the nib. The tip, having a higher melting point than the nib, usually does not melt or only to a slight extent.

Now, in resistance welding, the greatest amount of heat develops at the point of greatest resistance. With a given batch of tips, any slight inaccuracies in the shape or size of individual tips, or any differences in the surface condition of the tips, will cause variations in the contact resistance and hence in the amount of heat energy and the time required to attain the temperature of fusion. When this temperature is attained and the nib melts, the molten metal will flow around the tip and the latter will move into the body of the nib material, the position of greatest resistance, and hence the position of greatest heat development, gradually moving towards the point of smallest cross-sectional area, which is usually about .030" behind the nib point, until the heating is stopped. For a given time of current flow, therefore, this variation in contact resistance will cause variations in the amount of metal melted and hence variations in the overall lengths of the welded nibs, which, except within very small limits of tolerance, are undesirable from the point of view of any subsequent operations on the nib, such as grinding on automatic machines. Consequently, in dealing with minute tips, such as the tips of pen nibs, it becomes of prime importance, in order to obtain as great a uniformity as possible in the overall length of the finished welded article, to ensure that the heating shall be applied only for so long as to cause the required amount of the nib metal to melt and that the metal shall solidify and complete the weld when the tip has moved the predetermined required distance into the body of the nib.

With the object of effecting this dual control, it has already been proposed, in the manufacture of pen nibs, to cause a tip to enter a recess in a nib extending transversely of the longitudinal axis of the pen point and to effect welding by the passage of an electric current through the nib and the tip for a predetermined time, controlled by a suitable known timing device. The nib is arranged vertically above the tip and the amount of movement of the nib towards the tip is adjustably limited by means of a stop, the nib being preferably maintained in light contact with the tip.

Whilst, with such an arrangement, the time of passage of the welding current and the amount of movement of the nib relatively to the tip can both be independently predetermined, they cannot be so closely co-related as to allow for slight differences in the contact resistance due to variations in the shape or size of the tips. If the contact resistance is high, the limit position of the nib may be reached, due to rapid change in the position of greatest heat development, before the welding current is cut off. The nib will then continue to be heated at the same position and result in "necking" or localised heating of the nib to such an extent as ultimately to cause severance of the nib from the tip. A lower contact resistance, on the other hand, may result in the cutting-off of the welding current and the freezing of the molten metal before the limit position has been reached, with resulting incorrect length of the welded nib.

Another prior proposal for the welding of pen tips to pen nibs has been to control the flow of the welding current by arranging the nib in a holder vertically above, and in lightly pressed contact with, the tip which is carried in a support, the holder and support being relatively movable, and to cut off the welding current automatically upon movement of the nib, resulting from the melting of the metal during welding, a predetermined distance towards the tip, or vice versa, by the engagement of a projection on the movable holder or support with a resiliently mounted contact, movement of which breaks the welding circuit, whereupon the molten metal freezes.

Whilst this arrangement avoids one of the disadvantages of the prior proposal referred to above in that, given truly spherical tips, the relative movement of tip and nib is the same for each individual weld and premature freezing does not take place, the second disadvantage of the former proposal is not avoided. Since, as already pointed out, the heat energy supplied during any particular welding operation varies with the contact resistance encountered, it may happen that, when the welding current is cut off, sufficient heat has been developed and has to be dissipated to cause additional metal to be melted with the result that "necking" or localised heating may again take place with consequent weakening of the weld.

The principal object of this invention is to overcome the above disadvantages and to provide an improved method of, and means for, welding metallic tips to metallic bases enabling an efficient weld and an accurate uniformity of length of welded articles from any given batch to be obtained.

Another object of the invention is to prevent the possibility of localised heating or "necking" after the welding current has been cut-off by reducing the strength of the welding current during the period of flow thereof.

A further object is to provide means for reducing the welding current strength from an initial value sufficient to cause melting of metal to a value just sufficient to prevent freezing or solidification of the metal for a predetermined time.

A still further object is to provide means for automatically reducing the strength of the welding current at a predetermined position of the relative movement of the parts being welded.

A yet further object is to enable the welding current to be reduced in strength by the insertion therein at a predetermined time during the passage of said current of a suitable value resistance.

A still further object is to enable a resistance to be inserted in the welding circuit by the energisation of a relay circuit.

The value of the resistance required in any given instance will obviously vary within fairly wide limits depending on the particular conditions of welding, such as the voltage employed and the resistance of the circuit. It will be found in practice, however, that under normal conditions of welding, the value of the resistanc to be inserted will, in order to achieve the object of the invention, generally be within the range of about 10–100 ohms.

The relay circuit preferably includes a solenoid controlling the opening and closing of a pair of contacts included in the welding circuit and across which the resistance is shunted, such that, when the contacts are opened, the resistance is inserted in the circuit.

The rely circuit is preferably closed by the closing of a pair of cooperating contacts included in the said circuit, one of said contacts being movable with the movable element and the second being located a predetermined distance therefrom in the direction of movement of said movable element.

The second contact may be resiliently mounted, so as to be movable by further movement of said first contact into engagement with a fixed stop member, whereupon further movement of said movable element is positively prevented.

Alternatively, the relay may be operated by a timing device in known manner; or an electronic control device operable at a predetermined temperature, corresponding to the temperature of fusion of the metal, may be employed.

In order that the invention may be fully understood, one embodiment thereof will now be described, by way of example, as applied to the welding of metallic tips to pen nibs, by reference to the accompanying diagrammatic drawing, the single figure of which shows partly in section a simple resistance welding apparatus suitable for welding metallic tips to pen nibs and embodying welding current supply control means in accordance with the invention.

It is to be understood that the welding apparatus shown is purely illustrative for the purposes of the following description and forms per se no part of the invention.

Referring to the drawing, there is shown at 1 a frame or support for a resistance welding unit, said frame comprising a base 2, having a hole 3 therein and an upright wall 4 along one edge thereof.

On the base 2 is mounted adjacent one side thereof a trunnion 5 in which is pivoted one end of a lever 6 carrying at its other end a tip-supporting member or block 7 and a depending arm 8 carrying an adjustable screw 9.

The lever 6 is of such a length that the block 7 is normally located above the hole 3, whilst the screw 9 lies substantially within the said hole 3.

On the upright wall 4 is mounted, above the block 7, a clamp generally indicated at 10 and comprising a fixed part 11 and a movable part 12, the part 12 being movable towards and away from the part 11 by means of an adjusting screw 13 to enable a nib blank 14 to be held therebetween in the position shown or released therefrom.

The lever 6 is normally retained in the position shown with the block 7 engaging the outer end of the nib blank 14 by means of a tension spring 15, secured at one end thereof to the lever 6 at 16 and at the other end thereof to a pin 17 mounted in the wall 4.

Mounted on the lever 6 so as to extend laterally therefrom, is an arm 18 by means of which the lever 6 and block 7 may be lowered by hand against the action of the spring 15. An adjustable stop screw 3a is mounted in the base 2 beneath the lever 6 to limit the downward movement thereof.

Mounted on the base 2 by means of an L-shaped bracket 19 secured to the inner periphery of the hole 3 and extending inwardly over the said hole are two spring contacts 20 and 21 and an adjustable screw stop 22, the said contacts and screw stop being located vertically one above the other in the order named, and lying in the plane of movement of the aforesaid screw 9.

The block 7 is formed on its upper face with a V-shaped recess 23 for the reception of a tin 24.

The welding circuit comprises a step-down transformer 25, the secondary winding of which is connected by wires 26 and 27 to the aforesaid clamp 10 and the block 7, the primary winding being connected to a suitable source 28 of electric current supply.

The primary winding circuit includes a main control switch 29 and a pair of contacts 30, normally closed by a movable contact bar 31 and across which is shunted a resistance 32. The contact bar 31 is actuated to open and close the contacts 30 by means of a solenoid 33 forming part of a relay circuit 34 in which are included the aforesaid spring contacts 20 and 21.

The above described apparatus functions in the following manner:

Let it be assumed that, as shown in the drawing, a nib blank 14 has been inserted in the clamp 10, the lever 6 having been first swung downwardly against the action of the spring 15 by pressure of the operator's hand on the arm 18 so as to lower the block 7. After the nib blank 14 has been inserted and the screw 13 tightened to draw the parts 11 and 12 towards one another and grip the nib, a tip 24 is placed in the recess 23 of the block 7, pressure is removed from the arm 18 and the lever 6 with block 7 is allowed to rise under the action of its spring 15 until the tip 24 comes into contact with the nib blank 14.

The control switch 29 is then moved to closed position, to initiate the welding current. As the metal of the nib 14 melts, the block 7 and lever 6 gradually swing upwardly under the action of the spring 15 until the screw 9 comes into engagement with the contact 20 and moves it upwardly into engagement with the cooperating contact 21. The relay circuit 34 is thus closed and the solenoid 33 is energised, thereby opening the contacts 30 and inserting the resistance into the primary circuit of the transformer 25. The value of the resistance is so chosen that the welding current is thus reduced to a value just sufficient to prevent freezing of the metal, but to allow of further upward movement of the lever 6 until the contact 21 is brought into engagement with the fixed screw stop 22, whereupon further movement ceases. The control switch 29 is now actuated to open the welding circuit and allow the metal to freeze. At the same time, the solenoid 33 is de-energised and the contact bar 31 again closes the contacts 30.

Owing to the fact that the welding current has, during this latter movement, been reduced as above described, freezing of the metal takes place practically instantaneously and any "necking" of the nib 14, due to overheating, is entirely avoided.

When the weld has been completed, the lever 6 is again lowered and the clamp 10 is opened to release the nib 14 with the tip 24 now welded thereto.

The above sequence of operations may now be repeated with a fresh nib and tip.

It will be readily appreciated that by carrying out the welding operation in the manner above described, not only is the amount of relative movement of the tip and nib predetermined and constant for any desired number of welds, but the disadvantages referred to above in connection with prior proposals are entirely avoided in that differences in the amount of heat energy applied, due to differences in the contact resistance, cannot influence the efficiency of the weld or the final overall length of the finished article as, in the first place, the length is of necessity constant and, secondly, the heat has substantially been dissipated during the latter portion of the movement, that remaining when the current is finally cut-off being of such a low value as to be ineffective to cause overheating and consequent "necking" of the nib.

Although in the above, one example of the manner in which the invention may be carried out in practice has been described in detail by way of example, it will be understood that modification may be made therein without departing from the scope of the invention. For example, instead of the relay circuit 34 being initiated in the manner described, a time-controlled mechanism may be employed to close the relay circuit. Again, if desired, the welding circuit may be automatically cut-off on completion of the required amount of relative movement of tip and nib.

Furthermore, if desired, the tip-supporting block may be held stationary and the nib be movably mounted. The invention, moreover, is not limited to the welding of the tips to pen nibs, but is applicable to other welding operations involving the welding of metallic tips to metallic bases, such as in the manufacture of electrical contacts.

What I claim is:

1. Apparatus for welding a metallic tip element to a metallic base element comprising in combination a frame, a tip-supporting member and a base-holding member mounted on said frame; means for moving one of said members towards the other member so as to bring a tip element carried by said tip-supporting member into contact with a base element carried by said base-holding member and for maintaining said elements in contact with one another; an electric circuit including said base and tip elements; means for passing an electric current through said circuit to cause melting of at least one of said elements; a pair of normally closed contacts in said circuit; a resistance shunted across said contacts; a normally open relay circuit associated with said welding circuit; a solenoid in said circuit operatively associated with said contacts, said solenoid being operable to open said contacts on energisation of said relay circuit and means, operable on relative movement of said members a predetermined distance towards one another, to close said relay circuit and energise said solenoid whereby said contacts are opened and said resistance is inserted in said welding circuit and a fixed stop member on said frame for limiting the amount of relative movement of said members.

2. Apparatus as claimed in claim 1 wherein the relay circuit is closed by the closing of a pair of cooperating contacts included in the circuit, one of said contacts being movable with the movable member and the second being located a predetermined distance therefrom in the direction of movement of said movable member.

3. Apparatus for welding a metallic tip element to a metallic base element comprising in combination a frame, a tip-supporting member and a base-holding member mounted on said frame; means for moving one of said members towards the other member so as to bring a tip element carried by said tip-supporting member into contact with a base element carried by said base-holding member and for maintaining said elements in contact with one another; an electric circuit including said base and tip elements; means for passing an electric current through said circuit to cause melting of at least one of said elements; a pair of normally closed contacts in said circuit; a resistance shunted across said contacts; a normally open relay circuit associated with said welding circuit; a solenoid in said circuit operatively associated with said contacts, said solenoid being operable to open said contacts on energisation of said relay circuit and a pair of spaced resiliently mounted contacts on said frame, said contacts being included in said relay circuit; a projection on the movable member extending beneath said contacts and operable on movement of said member in one direction to close said contacts and energise said relay to insert said resistance in said welding circuit and in the other direction to open said contacts and a fixed stop member mounted on said frame for limiting movement of said movable member.

4. Apparatus for welding a metallic tip element to a metallic base element comprising in combination; a supporting frame; a base-holding member fixedly mounted on said frame; a pivot on said support; an arm swingably mounted in said pivot; a tip-supporting member carried by said arm; a spring connected to said frame and said arm for constantly urging said tip-supporting member towards said base-holding member so as to bring a tip element carried by said tip-support into contact with a base element carried by said base-holding member and to maintain same in contact; a fixed stop member carried by said frame; a pair of normally spaced resiliently mounted contacts mounted on said frame beneath said fixed stop member; a projection on said arm extending beneath said contacts, said projection being operable to close said contacts upon movement of said arm in one direction; an electric welding circuit including said base-holding member and said tip-supporting member; a pair of normally closed contacts in said welding circuit; means for passing an electric current through said welding circuit to cause melting of at least one of said elements; a resistance shunted across said last mentioned contacts; a relay circuit shunted across said welding circuit and including said resiliently mounted contacts; a solenoid in said relay circuit operatively associated with said welding circuit contacts said solenoid being operable to open said contacts on energisation of said relay circuit upon the closing of said resiliently mounted contacts by movement of said arm.

5. In a method of welding a metallic tip element to a metallic base element in which said elements are constantly positively urged into pressure contact with one another and in which an electric welding current is passed through said contacting elements to cause melting of metal of at least one of them, the step of automatically inserting into said welding circuit, upon and as a result of movement of one of said elements a predetermined distance towards the other, a resistance of a value sufficient to reduce said welding current to a strength adequate only to delay freezing or solidification of the molten metal, continuing the passage of said reduced strength current during a further predetermined amount of relative movement of said elements and finally cutting off said current.

6. Apparatus for welding a metallic tip element to a metallic base element comprising in combination; a tip-supporting member, a base supporting member, one of said members being movable and constantly urged towards the other member to maintain the tip and base in contact with the base; an electric circuit including said tip and base; means for passing an electric current through said tip and base to cause melting of at least one of them; a resistance operatively associated with, and insertible in, said circuit, said resistance being normally held out of circuit, and movable-member operated means for automatically inserting said resistance into said circuit upon movement of said movable member a predetermined distance towards the other member to reduce the current strength to a value just sufficient to prevent freezing of molten metal; means for stopping said relative movement and means for cutting off said reduced current.

7. Apparatus for welding a metallic tip element to a metallic base element comprising in combination; a tip-supporting member, a base supporting member, one of said members being movable and constantly urged towards the other member to maintain the tip and base in contact with the base; an electric circuit including said tip and base; means for passing an electric current through said tip and base to cause melting of at least one of them; a pair of normally closed contacts in said circuit; a resistance shunted across said contacts; electro-magnetic means operable upon movement of said movable member a predetermined distance towards the other member automatically to open said contacts and insert said resistance in said welding circuit, and a fixed stop member for positively stopping said movement.

NORMAN ALBERT TUCKER.

REFERENCES CITED

The following references are of record in the file of this patent:

UNITED STATES PATENTS

| Number | Name | Date |
| --- | --- | --- |
| 1,314,515 | Gravell | Sept. 2, 1919 |
| 2,145,274 | Pfanstiehl | Jan. 31, 1939 |
| 2,462,882 | Martin | Mar. 1, 1949 |

FOREIGN PATENTS

| Number | Country | Date |
| --- | --- | --- |
| 559,658 | Great Britain | Feb. 29, 1944 |